W. G. TAYLOR.
VALVE.
APPLICATION FILED MAY 5, 1909.
984,718.
Patented Feb. 21, 1911.
2 SHEETS—SHEET 1.
Fig. 1.
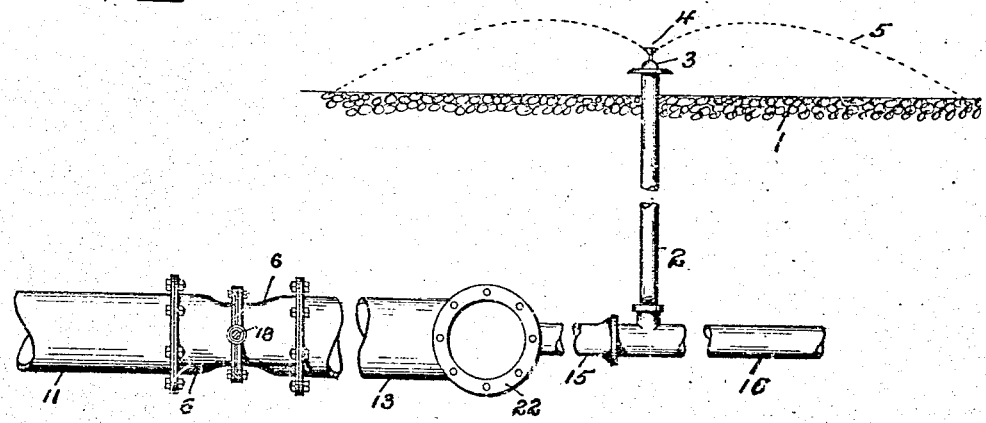
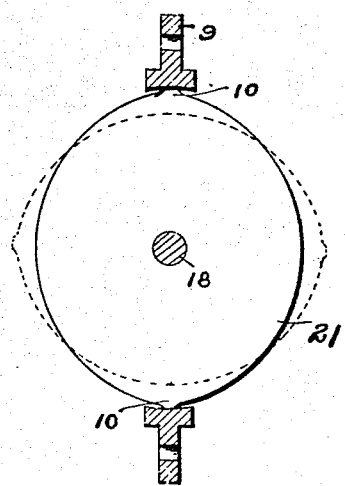
Fig. 2.
WITNESSES
Florence H. Monk
Gertrude Brethauer
INVENTOR
William Garvin Taylor
BY George C. Hall
ATTORNEY

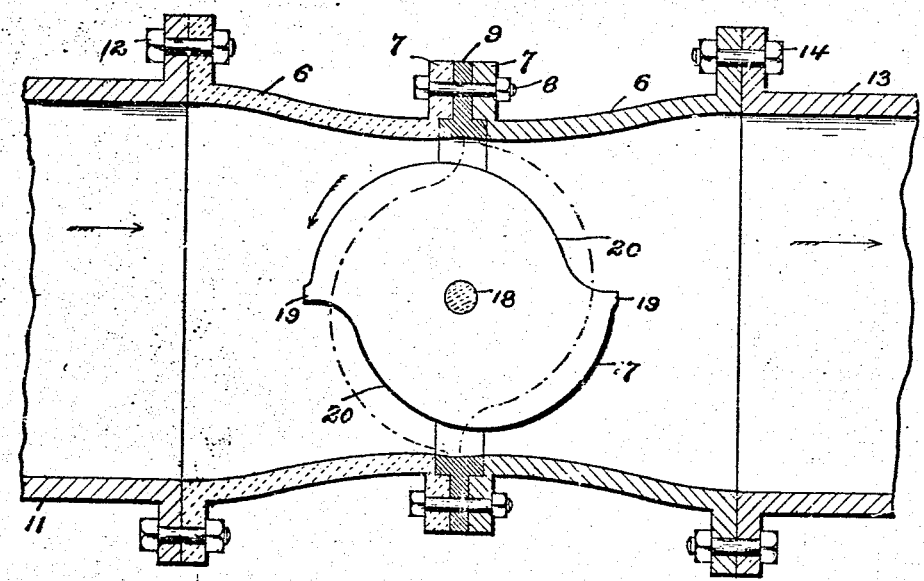
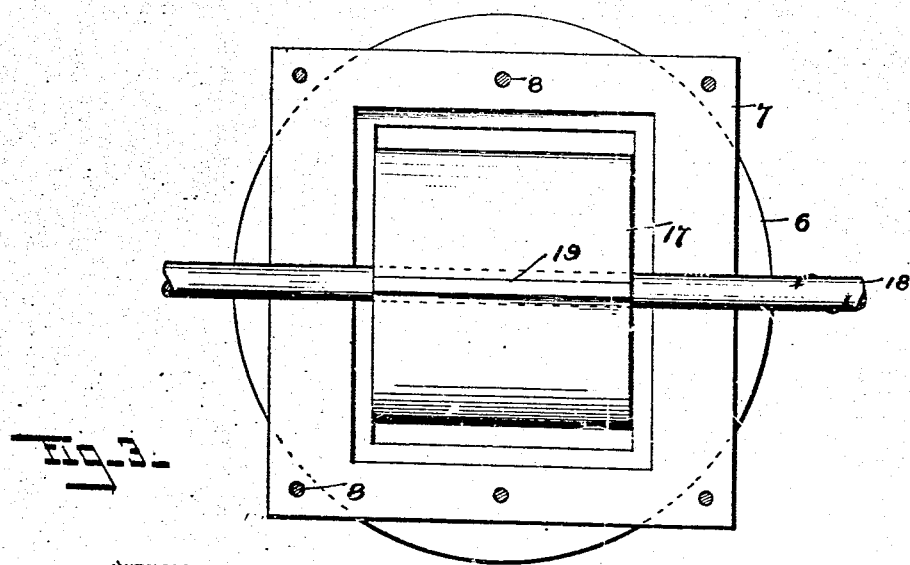

UNITED STATES PATENT OFFICE.

WILLIAM GAVIN TAYLOR, OF WATERBURY, CONNECTICUT.

VALVE.

984,718.  Specification of Letters Patent.  Patented Feb. 21, 1911.

Application filed May 5, 1909.  Serial No. 494,124.

*To all whom it may concern:*

Be it known that I, WILLIAM GAVIN TAYLOR, a citizen of the United States, residing at Waterbury, in the county of New Haven and State of Connecticut, have invented certain new and useful Improvements in Valves, of which the following is a specification, reference being had therein to the accompanying drawings.

My invention relates to new and useful improvements in valves, and has for its object, among other things, to provide means whereby the substance which enters the valve at a uniform pressure may be discharged therefrom under a variable pressure; and to accomplish this result with mechanism that is simple in design and may be constructed at the minimum cost.

To these, and other ends, my invention consists in the valve having certain details of construction and combinations of parts as will be hereinafter described and more particularly pointed out in the claims.

Referring to the drawings, in which like numerals of reference designate like parts in the several figures; Figure 1 is an elevation of my improved device as connected with a sewage distributing system; Fig. 2 is a longitudinal, sectional view thereof; Fig. 3 is an end view of one of the sections with the valve plate mounted therein; and Fig. 4 is a view of a modified form of valve plate.

The uses to which my improved valve may be applied are manifold, but it has especial value when used with sewage distribution devices, and largely for purposes of illustration it is herein described as connected therewith.

It is the practice in distributing sewage over a filtration bed to deliver the sewage in a substantially liquid form from a riser pipe onto the spreading cone of a nozzle which deflects it radially and scatters it over said bed. Heretofore it has been the practice to pass this sewage through the riser at a uniform pressure resulting in the major portion of the sewage being distributed over a very limited area of the entire filtration bed.

In Fig. 1 is shown a portion of a filtration bed which is designated by the numeral 1, and through which projects the riser pipe 2 having the nozzle dome 3 thereon, in which is fixed the spreading cone 4, and the broken lines 5 indicate the path of the sewage deflected from said cone when the same is thrown in contact therewith under a uniform pressure, and the maximum line of deflection when the pressure is varied. By discharging the sewage at a constant, uniform pressure it will always travel through substantially the path shown by the lines 5, thereby piling up said sewage upon the filtration bed at the point where this line contacts therewith. Of course, small particles to a greater or less degree will be separated from the sewage while in the air and drop onto the filtration bed close to the riser, but the amount of the droppings in the aggregate is very insignificant.

The capacity of the filtration bed is necessarily largely increased if the sewage is evenly distributed over the entire area, and one means of accomplishing this result is to vary the pressure of the sewage as it passes through the riser. It being obvious that with less pressure upon the spreading cone the sewage will not be thrown radially the same distance as it would under a greater pressure, therefore by varying this pressure from zero to the maximum the sewage will be distributed uniformly over the entire area of the bed between the riser and the maximum and vice versa pressure throw. To thus provide a variable pressure, I have constructed my improved valve of the two sections 6 which are provided with the flanges 7 upon their inner faces, between which is the collar 9, preferably made of bronze or other noncorrodible material, and the whole secured together by suitable bolts 8. To one of said sections is secured an inlet pipe 11 by the bolts 12, and to the other is secured the outlet pipe 13 by the bolts 14, the outlet pipe 13 being connected with a distributing pipe 22 that is connected by the pipe 15 with the riser main 16 having one or more risers 2 fixed therein. The form, and detailed construction of the valve and collar, as well as their mode of attachment, are subject to modification, as the particular form and shape of these parts as shown herein are not essential. The various forms of the opening in the collar 9 are made without reference to the size of the inlet pipe 11, as within my invention the area may be greater or less than that of said inlet pipe.

Journaled within the collar 9 is the valve plate 17 fixed on the shaft 18 which is either continuously or intermittently rotated by any preferred means, the nature of which is not material to my invention and therefore not shown or described herein. This valve plate is preferably formed with two oppositely disposed, radially projecting lips 19 that are connected on either side of the center by a curved portion 20 eccentric to the shaft 18, so that during the rotation of said valve plate the open space between the outer edge thereof and the inside of the valve collar 9 is gradually enlarged or diminished on both sides of the center of the shaft according to the direction of movement of said valve plate. The outside diameter of the lips 19 is the same as that of the inside of the collar 9, so that when said lips 19 are in contact therewith the valve is entirely closed, as shown by the broken lines in Fig. 2, and as the valve plate revolves in the direction of the arrow in Fig. 2, the open space on either side of said valve plate between the edge thereof and the collar 9 is gradually enlarged, hence the pressure of the substance passing therebetween is gradually increased until the maximum pressure is obtained, the position of the plate at this point being shown by full lines in Fig. 2. The sewage striking the spreading cone 4 at this graduated pressure progressively increases its throw from zero to its maximum, shown by the broken lines in Fig. 5, or vice versa, thus distributing it over the entire area of the filtration bed between the riser and its maximum.

In Fig. 4 the valve plate 21 is elliptical in form, so that the valve is entirely closed when the lips 10, at the ends of the major axis thereof, are in contact with the interior of the collar 9, and during the rotation of the valve plate in either direction the open space between the edges thereof and the interior of the collar 9 is increased until the minor axis of said elliptical plate is at right angles to the position shown in Fig. 4, indicated by broken lines, when the open space between said valve plate and collar is at its maximum. The continual rotation of said valve plate gradually decreases the area of this open space until the lips 10 are again in contact with the collar 9, when the valve is entirely closed. With this particular style of valve plate the area of diffusion is at a minimum at the beginning of rotation and gradually increases to the maximum at the half stroke and returns to the minimum again during the completion of its rotation. The lips 19 and 10 upon the valve plates are desirable, but not essential, as the outer edge of the said plates may at two points thereon, located diametrically opposite each other, have a diameter equal to that of the said lips.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In combination with a valve body; of means for changing the pressure of the matter entering said valve at a uniform pressure so that it will pass through the outlet end under a continuously varying pressure, said means comprising a rotating valve plate, having oppositely disposed portions on the outer edge thereof an equal distance from the center of said valve plate and the axis upon which it rotates, and the contour of said edge between said oppositely disposed portions being the same shape upon both sides of said center but not concentric therewith.

2. In combination with a valve body; of means for changing the pressure of the matter entering said valve at a uniform pressure so that it will pass through the outlet end under a continuously varying pressure, said means comprising a valve plate rotating upon an axis substantially parallel with the outer edge thereof and having oppositely disposed portions upon said outer edge an equal distance from the center of said valve plate, with that portion of the edge of said valve plate between said oppositely disposed portions at progressively varying distances from said center.

3. In combination with a valve body; of a collar fixed therein; means for varying the pressure of the matter entering said valve body at a uniform pressure so that it will pass through the outlet end under a continuously varying pressure, said means comprising a valve plate continuously rotating upon an axis substantially parallel with the outer edge thereof having oppositely disposed portions upon said outer edge an equal distance from the center of said valve plate and the axis upon which it rotates, and the contour of said edge between said oppositely disposed portions being the same shape upon both sides of said center but not concentric therewith.

4. In combination with a valve body, composed of two sections; of a collar fixed therebetween; means for changing the pressure of the matter entering said valve body at a uniform pressure so that it will pass through the outlet end under a continuously varying pressure, said means comprising a valve plate rotating upon an axis substantially parallel with the outer edge thereof, having oppositely disposed portions upon said outer edge an equal distance from the center of said plate and the axis upon which it rotates, and the contour of said edge between said oppositely disposed portions being the same shape upon both sides of said center but not concentric therewith.

5. In a valve, the combination with a valve body; of a plate with an irregular contour of calculable form having oppositely disposed portions thereon, equally distant from the center of said valve plate; means for rotarily mounting said valve plate so that the open space between said valve plate and the inside of said valve body is progressively increased or decreased during the rotation of said plate, according to the direction of rotation thereof, from the initial position of said valve plate, wherein the said oppositely disposed portions are in contact with the inside of said valve body.

In testimony whereof I affix my signature in presence of two witnesses.

WILLIAM GAVIN TAYLOR.

Witnesses:
 MABLE THUNBERG,
 ROBERT DENNISON.